(12) United States Patent
Klissner et al.

(10) Patent No.: US 8,533,747 B2
(45) Date of Patent: Sep. 10, 2013

(54) METHOD AND SYSTEM FOR SELECTING ONE OR MORE INTEGRATED CIRCUIT CARD INTERFACE DEVICES

(75) Inventors: Paul K. Klissner, San Mateo, CA (US); Michael S. Bender, Novato, CA (US)

(73) Assignee: Oracle America, Inc., Redwood City, CA (US)

( * ) Notice: Subject to any disclaimer, the term of this patent is extended or adjusted under 35 U.S.C. 154(b) by 1360 days.

(21) Appl. No.: 12/254,208

(22) Filed: Oct. 20, 2008

(65) Prior Publication Data

US 2010/0100893 A1 Apr. 22, 2010

(51) Int. Cl.
- *G06F 3/00* (2006.01)
- *G06F 9/44* (2006.01)
- *G06F 9/46* (2006.01)
- *G06F 13/00* (2006.01)

(52) U.S. Cl.
USPC .......................................... 719/328; 719/320

(58) Field of Classification Search
USPC ................................................ 719/320, 328
See application file for complete search history.

(56) References Cited

U.S. PATENT DOCUMENTS

| | | | |
|---|---|---|---|
| 7,864,787 B2 * | 1/2011 | Oved | 370/401 |
| 2002/0091880 A1 * | 7/2002 | Hamann et al. | 710/1 |
| 2006/0170565 A1 * | 8/2006 | Husak et al. | 340/825.49 |
| 2008/0041931 A1 * | 2/2008 | Lu et al. | 235/375 |

OTHER PUBLICATIONS

Mayes et al., Smart Cards, Tokens, Security and Applications, Springer, Jan. 7, 2008, Chapter 12, pp. 277-293.*
Chirico, .NET Smart Card API, www.ugosweb.com, Oct. 12, 2007, pp. 1-4.*
Magencio, How to select which Smart Card reader to perform actions on, Decrypt my World, Mar. 3, 2008, 2 pages.*
Izik, Reverse Engineering with LD_PRELOAD, Jul. 2005, pp. 1-8.*
Wheeler, Program Library HOWTO, version 1.20, Apr. 2003, Chapter 3—Shared Libraries, 9 pages.*

* cited by examiner

*Primary Examiner* — Diem Cao
(74) *Attorney, Agent, or Firm* — Brooks Kushman P.C.

(57) ABSTRACT

A method for selecting at least one smart card reader from a list of smart card readers includes receiving a parameter indicative of a reader selection criteria, setting an environment variable that specifies a reader filtering library, executing an application that uses a smart card access library, and interposing the reader filtering library between the application and the smart card access library.

15 Claims, 2 Drawing Sheets

METHOD AND SYSTEM FOR SELECTING ONE OR MORE INTEGRATED CIRCUIT CARD INTERFACE DEVICES

BACKGROUND

Environment variables are a set of dynamic values that may affect the way running processes will behave on a computer. In Unix and Unix-like systems, each process has its own private set of environment variables. By default, when a process is created it inherits a duplicate environment of its parent process, except for explicit changes made by the parent when it creates the child. Alternatively, from shells such as bash, an environment variable may be changed for a particular command invocation by, for example, indirectly invoking it via env or using the ENVIRONMENT_VARIABLE=VALUE<command> notation.

Regular expressions are a context-independent syntax that may represent a wide variety of character sets and character set orderings, where these character sets are interpreted according to the current locale. While many regular expressions may be interpreted differently depending on the current locale, many features, such as character class expressions, provide for contextual invariance across locales.

In computing, regular expressions may provide a concise and flexible means for identifying strings of text of interest, such as particular characters, words, or patterns of characters. Regular expressions are written in a formal language that may be interpreted by a regular expression processor, a program that either serves as a parser generator or examines text and identifies parts that match the provided specification.

SUMMARY

A method for selecting at least one smart card reader from a list of smart card readers includes receiving a parameter indicative of a reader selection criteria, setting an environment variable that specifies a reader filtering library, and executing an application that uses a smart card access library. The smart card access library presents smart card access infrastructure to the application. The method also includes interposing the reader filtering library between the application and the smart card access library to filter the list according to the reader selection criteria to select at least one of the smart card readers.

A method for selecting at least one smart card reader from a list of smart card readers includes receiving a first environment variable indicative of a reader selection criteria, setting a second environment variable that specifies a reader filtering library, and executing an application that uses a smart card access library that implements a smart card API. The method also includes proxying the reader filtering library between the application and the smart card access library to filter the list according to the reader selection criteria to select at least one of the smart card readers.

A system for selecting at least one smart card reader from a list of smart card readers includes one or more computers configured to receive a parameter indicative of a reader selection criteria, set an environment variable that specifies a reader filtering library, and execute an application that uses a smart card access library that implements a smart card API. The one or more computers are further configured to interpose the reader filtering library between the application and the smart card access library to filter the list according to the reader selection criteria to select at least one of the smart card readers.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
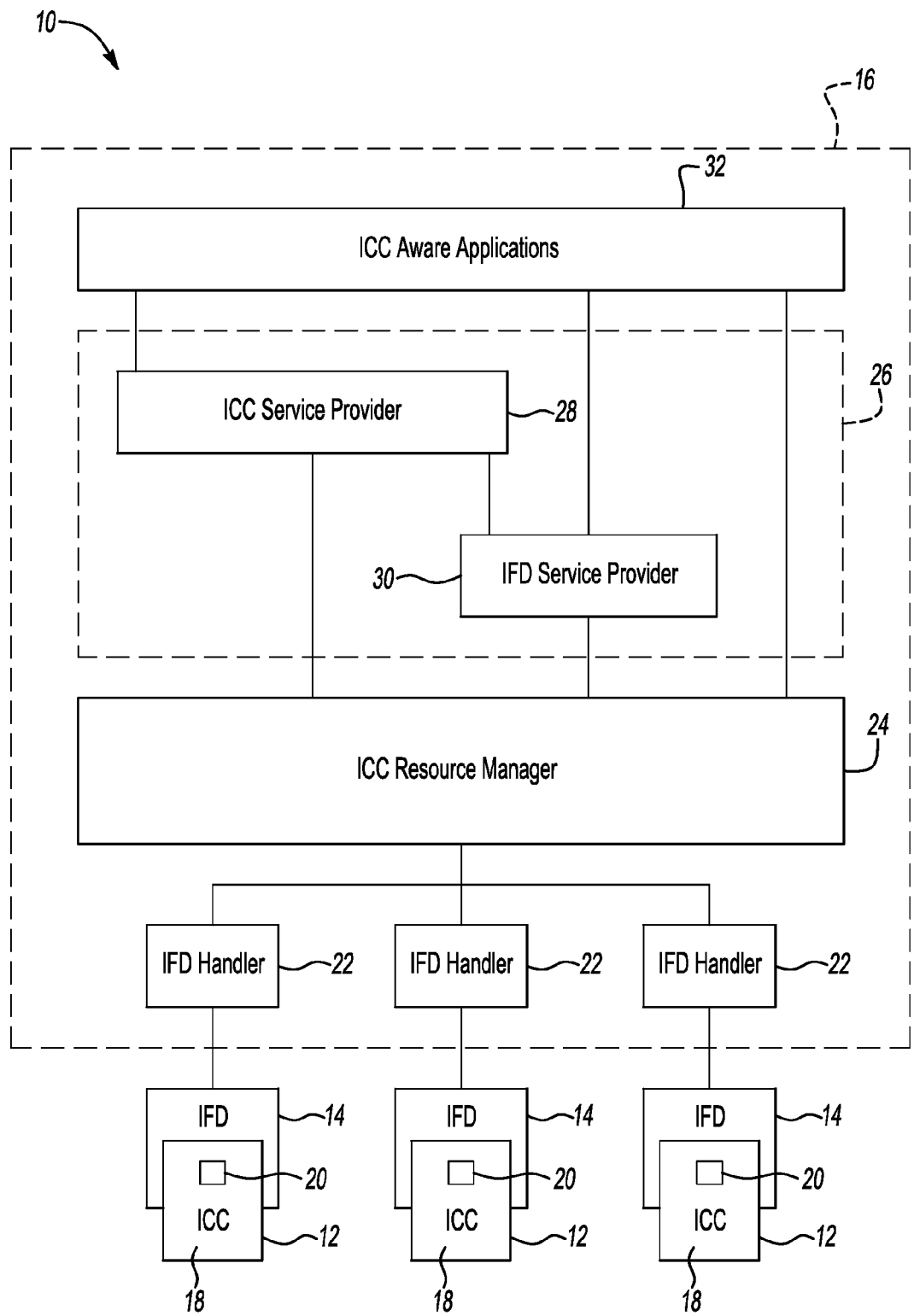
FIG. 1 is a block diagram of an embodiment of an Integrated Circuit Card (ICC) environment.

Referring now to FIG. 1, an embodiment of an Integrated Circuit Card environment 10 includes a plurality of Integrated Circuit Cards (ICCs) 12 each inserted into a respective interface device (IFD) 14. The IFDs 14 are in communication with one or more computers 16.

Each of the ICCs 12, or smart cards, includes a credit card-sized plastic case 18 with an embedded microprocessor chip 20. In certain embodiments, the microprocessor chip 20 may have the ability to store large amounts of data, carry out on-card functions, e.g., encryption and mutual authentication, and interact intelligently with an IDF 14. Of course, in other embodiments the ICCs 12 may instead include a memory chip. The ICCs 12 of FIG. 1 conform physically and electrically to the ISO 7816-1, 7816-2, and 7816-3 standards. In other embodiments, the ICCs 12 may be contactless and communicate with the IFDs 14 using, for example, radio frequencies. Any suitable ICC configuration, however, may be used. For example, the ICCs 12 may take the form of fobs, subscriber identification modules used in GSM mobile phones, or USB-based tokens.

As known in the art, the ICCs 12 may be used as digital identification cards. In this application, the cards are used for authentication of identity. A common use example is in conjunction with a PKI. An ICC 12 may store an encrypted digital certificate issued from the PKI along with any other relevant or needed information about the card holder.

The IFDs 14, or smart card readers, are physical interface devices through which the ICCs 12 may communicate with the one or more computers 16. The IFDs 14 may provide DC power to the microprocessor chips 20. Also, the IFDs 14 may provide clock signals which step the program counters of the microprocessor chips 20, as well as an I/O line through which digital information may be passed between the IFDs 14 and the ICCs 12.

The IFDs 14 may have one or more slots to read the ICCs 12 and may also support some extended capabilities such as display or PINpad. The IFDs 14 may use a variety of physical access ports to the one or more computers 16. Typically, these will be the keyboard port, a serial line port, a PC Card (PCM-CIA), or the Universal Serial Bus (USBport). In some embodiments, the IFDs 14 may conform to the ISO 7816-1, 7816-2 and 7816-3 standards. In addition, the IFDs 14 may support synchronous cards or the ISO/IEC 14443 or 15693 protocol for contactless cards.

The one or more computers 16 of FIG. 1 include a plurality of Interface Device Handlers (IFD Handlers) 22 and an ICC Resource Manager 24. The IFD Handlers 22 may encompass the software to map the native capabilities of the IFDs 14 to the IFD Handlers 22. In certain embodiments, the IFD Handlers 22 are low-level software within the one or more computers 16 that support the specific I/O channels used to connect the IFDs 14 to the one or more computers 16 and may provide access to specific functionality of the IFDs 14.

The IFDs 14 and IFD Handlers 22 may handle the protocols necessary for the ICCs 12 and map Application Data Units (APDUs) given by an application to the corresponding ICC commands. For contactless ICCs 12, implementation of the IFDs 14 and IFD Handlers 22 may emulate basic functional requirements such as card insertion and removal events, etc. The IFDs 14 and IFD Handlers 22 may also take care of the initialization, selection and communication processes with the ICCs 12. In different embodiments, the IFDs 12 may vary in their implementations. For the simplest devices, an IFD 14 may provide little more than electrical connectivity and I/O signal passing between the ICC 12 and the one or more computers 16. In more complex configurations, for example, an IFD 14 may support the data link layer protocols defined in the ISO 7816-3 standard.

The ICC Resource Manager 24 may be responsible for managing ICC-relevant resources and for supporting controlled access to the IFDs 14 and, through them, individual ICCs 12. The ICC Resource Manager 24 may perform several access management functions for the ICCs 12 and IFDs 14. First, the ICC Resource Manager 24 may be responsible for identification and tracking of resources. This may include tracking installed IFDs 14 and making this information accessible to other applications, tracking known ICC types, along with their associated service providers 26 (discussed below) and supported Interfaces, and making this information accessible to other applications, and tracking ICC insertion and removal events to maintain accurate information on available ICCs 12 within the IFDs 14. Second, the ICC Resource Manager 24 may be responsible for controlling the allocation of IFDs 14 and resources (and hence access to ICCs 12) across multiple applications. In certain embodiments, the ICC Resource Manager 24 may do this by providing mechanisms for attaching to specific IFDs 14 in shared or exclusive modes of operations. Additionally, the ICC Resource Manager 24 may support transaction primitives on access to services available within a given ICC 12. This may be important, as some ICCs 12 are single-threaded devices, which may require execution of multiple commands to complete a single function. Transactions may allow multiple commands to be executed without interruption, ensuring that intermediate state information is not corrupted.

The one or more computers 16 may further include service providers 26 (e.g., ICC Service Provider (ICCSP) 28 and IFD Service Provider (IFDSP) 30) and one or more ICC Aware Applications 32. The service providers 26 may encapsulate functionality exposed by a specific ICC 12 or IFD 14, and make it accessible through high-level programming interfaces. These interfaces may be enhanced and extended to meet the needs of specific application domains. In certain embodiments, the service providers 26 may be client/server components. Any suitable configuration, however, may be used.

The ICCSP 28 interfaces ICC functionality. As known in the art, there may be several different types of ICCSP 28. As an example, ICC Operating System Service Providers (ICCOSSPs) may encapsulate access to functionality from a specific ICC Operating System (ICCOS) through high-level programming interfaces. An ICCOSSP may need to be introduced to the ICC Resource Manager 24 to map it to a particular ICCOS. There may be a one-to-one relationship between the ICCs 12 and their ICCOSSP. As another example, Application Domain Service Providers (ADSPs) interface a particular on-card application. This may differentiate the ADSPs from other ICCSP 28 which interface to an ICC-type or ICCOS. As yet another example, Application Domain Service Provider Locators (ADSPL) allow dynamic assignment of certain ICCSP 28 because the static linking between ICC-Type and available ICCSPs 28, as performed by the ICC Resource Manager 24, may not be possible in a multi-application card environment. The ADSPL may be loaded by the ICC Resource Manager 24 and may allow ICC Resource Manager 24 to provide off-card applications with, for example, a way of listing on-card applications and a way of retrieving a reference to the appropriate ADSP implementation related to a chosen on-card application.

Generally, the ICCs 12 may be identified by the ATR String they present to the off-card system. All information regarding the identification of an ICC 12 may be available on the ICC 12 itself. Identity information is stored in an ICC Info Structure, or "extended" ATR. The information may be placed, for example, in a file or applet depending on the ICC technology. The ICCs 12 may include a command in the ATR's historical bytes, which may be used by the off-card system, e.g., the ICC Resource Manager 24, to retrieve the ICC Info Structure.

In embodiments having this type of enhanced ICC 12, the ICC Resource Manager 24 may interpret the historical bytes of the ATR, send the included command back to the ICC 12, and retrieve the ICC Info Structure. The information from this structure may then be used by the ICC Resource Manager 24 to identify the ICC 12.

When one of the ICCs 12 is, for example, inserted into one of the IFDs 14, the ICC Resource Manager 24 may retrieve the ICC Info, get the ADSPL reference from the ICC Info Structure and load the ADSPL. If appropriate, the ICC Resource Manager 24 may retrieve the list of on-card applications from the ADSPL. The off-card application may get this list from the ICC Resource Manager 24. It may then choose from this list the appropriate on-card application and load the corresponding ADSP to interact with the on-card application.

If extended IFD 14 capabilities are available, they may be presented to the ICC Aware Applications 32 or ICCSP 28 through high level programming interfaces implemented in the IFDSP 30. The IFDSP 30 may encapsulate access and interface with IFD functionality in the same way the ICCSP 28 interface with ICC functionality.

For each Application Context (which may define some type of functionality), the IFDSP 30 may provide different interfaces. The interface implementation by the IFDSP 30 may interact with the implementation of the IFD Handler 22 in a mode that is transparent to the ICC Resource Manager 24. In certain embodiments, the IFDSP 30 may be composed of modular components. As such, the services associated with an IFD 14 may evolve, as in an IFD 14 with download capability.

The ICC Aware Application 32 may be an arbitrary software program within the operating environment of the one or more computers 16 that wants to make use of the functionality provided by one or more of the ICCs 12. In the embodiment of FIG. 1, the ICC Aware Application 32 is running as a process within a multi-user, multiprocess, multiple-threaded, and multiple device environment. Application requests may be mapped to the ICCs 12.

In certain circumstances, the ICC Aware Application 32 may assume that only one IFD 14 is available or may select the first IDF 14 presented by an ICC library. For example, as illustrated in FIG. 1, each of the IFDs 14 has an ICC 12. Only one of the ICCs 12 may be viable for logging in. If the incorrect IFD 14 is selected, an attempt to log in may be unsuccessful.

Figure 2:
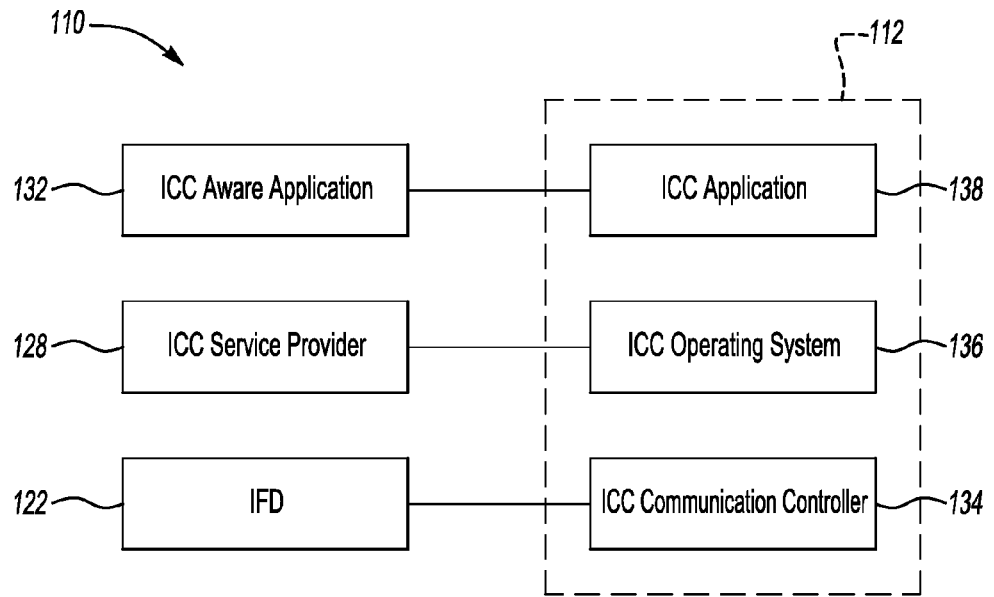
FIG. 2 is a block diagram of another embodiment of an ICC environment.

Referring now to FIG. 2, numbered elements that differ by 100 relative to the numbered elements of FIG. 1 have similar descriptions to the numbered elements of FIG. 1. Another embodiment of an Integrated Circuit Card environment 110 may be presented as a peer-to-peer communication protocol. For example, data may be exchanged between an IFD 114 and ICC Communication Controller 134 as controlled by the ISO 7816 protocol. APDUs may be passed between an ICC Service Provider 128 and an ICC Operating System 136 (also controlled by the ISO 7816 protocol). Service requests may be passed between an ICC Aware Application 132 and an ICC Application 138. Of course, other configurations are also possible.

Figure 3:
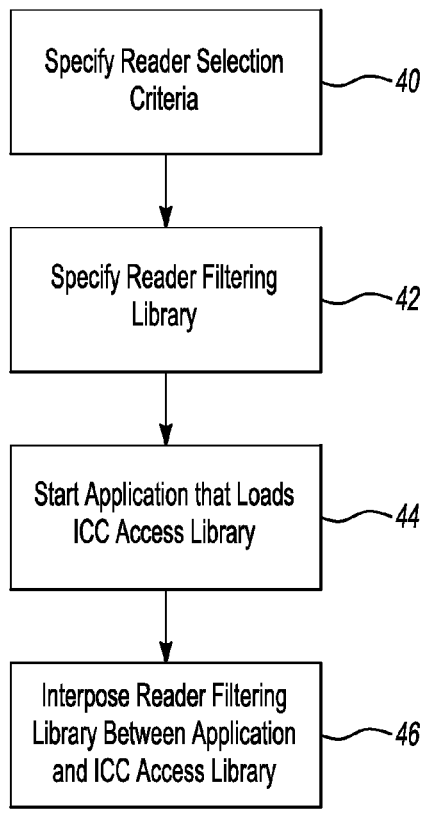
FIG. 3 is a flow chart depicting an example algorithm for selecting at least one ICC from a list of ICCs.

Referring now to FIGS. 1 and 3, a user specifies a reader selection criteria in, for example, an environment variable as a regular expression as indicated at 40. The regular expression may determine which IFDs 14 from among a list of available IFDs 14 will be matched and selected for further processing. (The unmatched IFD names in the list may be discarded.)

As indicated at 42, another environment variable, e.g., LD_PRELOAD, is set to indicate the location (directory path and file name) in the file system where a filtering library is located. Other suitable techniques, however, may be used.

As indicated at 44, an application 32 is started that loads, for example, the PC/SC-lite library. Any suitable library, however, may be loaded. As known to those of ordinary skill, this library presents an ICC access Application Programming Interface (API) via which the IFDs 14 may be located and accessed, and through which the ICCs 12 may be communicated with programmatically.

As indicated at 46, the filtering library is interposed between the application 32 and the ICC access library. In certain embodiments, when the application 32 is launched, the filtering library specified in the LD_PRELOAD environment variable is loaded by the operating system, before any of the libraries used by the application 32 are loaded. This filtering library, or interposing library, may be librdrselect.so.1, which defines a single function named SCardListReaders( ). A function by the same name, SCardListReaders( ) is also defined in the ICC library, libpcsclite.so.1, (a library that implements and exposes the PC/SC-lite API). Because librdrselect.so.1 (the interposing library) and libpcsclite.so.1 (the ICC library being interposed upon) both expose a function of the same name, i.e., SCardListReaders( ), the interposing library's differing implementation of the identically named function will be called anytime the application 32 invokes SCardListReaders( ) (instead of the ICC library's implementation of SCardListReaders( ) getting called, due to library interpositioning managed by the operating system in a way transparent to the application 32).

When such a preloaded library's function intercepts a function call, and then the preloaded function invokes the function it intercepts (in this example, when SCardListReaders( ) defined in librdrlist.so.1 invokes SCardListReaders( ) in libpcsclite.so.1), the intercepting function may be said to be "interposing" or "proxying" because the interposer is effectively juxtaposed between the calling application and the application's intended target library (in this case the ICC library). Such an interposing library function may be in a position to collect, analyze, filter, process and modify data that flows between the application 32 and the intercepted function.

When the interposing SCardListReaders( ) function is called, it may perform a service of filtering the list of IFD names returned by the original SCardListReaders( ) function in the ICC library according to the following example algorithm:

1. The environment variable LIBRDRSELECT is read by the interposer and the regular expression that determines the reader selection criteria is extracted from it.
2. The interposer collects the SCardListReaders( ) function parameters sent by the application 32 and uses them as arguments in a forward call to SCardListReaders( ) in the ICC library.
3. The ICC library returns a list of IFDs 14 to the immediate caller, which is, in this example, the interposer library.
4. The list of reader names returned from SCardListReaders( ) in the ICC library is iterated through by SCardListReaders( ) in the interposer library, in a loop to find those names that match the regular expression selection criteria described in 1 by invoking a function that processes regular expressions against a string, returning a match or non-match indication.
5. The list of matching IFDs 14, i.e., the filtered IFD list, is returned to the application 32, which is the immediate caller of the interposer library.

As apparent to those of ordinary skill, the algorithms disclosed herein are explained within the context of a UNIX system. Of course, the algorithms may be implemented in other suitable operating system environments. Furthermore, the algorithms may be deliverable to a processing device in many forms including, but not limited to, (i) information permanently stored on non-writable storage media such as ROM devices and (ii) information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), state machines, controllers or other hardware components or devices, or a combination of hardware, software and firmware components.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for selecting at least one smart card reader from a list of smart card readers, the method comprising:
   receiving a parameter indicative of a reader selection criteria;
   setting an environment variable that specifies a reader filtering library;
   executing an application that uses a smart card access library, the smart card access library presenting smart card access infrastructure to the application; and
   interposing the reader filtering library between the application and the smart card access library to filter the list according to the reader selection criteria to select at least one of the smart card readers.

2. The method of claim 1 wherein the smart card access library implements a smart card API.

3. The method of claim 2 wherein the smart card API comprises PC/SC-lite.

4. The method of claim 1 wherein the parameter comprises another environment variable.

5. The method of claim 1 wherein the reader selection criteria comprises reader name.

6. The method of claim 1 wherein the environment variable is named LD_PRELOAD.

7. A method for selecting at least one smart card reader from a list of smart card readers, the method comprising:
- receiving a first environment variable indicative of a reader selection criteria;
- setting a second environment variable that specifies a reader filtering library;
- executing an application that uses a smart card access library that implements a smart card API; and
- proxying the reader filtering library between the application and the smart card access library to filter the list according to the reader selection criteria to select at least one of the smart card readers.

8. The method of claim 7 wherein the smart card API comprises PC/SC-lite.

9. The method of claim 7 wherein the reader selection criteria comprises reader name.

10. The method of claim 7 wherein the second environment variable is named LD_PRELOAD.

11. A system for selecting at least one smart card reader from a list of smart card readers, the system comprising:
- one or more computers configured to
  - receive a parameter indicative of a reader selection criteria,
  - set an environment variable that specifies a reader filtering library,
  - execute an application that uses a smart card access library that implements a smart card API, and
  - interpose the reader filtering library between the application and the smart card access library to filter the list according to the reader selection criteria to select at least one of the smart card readers.

12. The system of claim 11 wherein the smart card API comprises PC/SC-lite.

13. The system of claim 11 wherein the parameter comprises another environment variable.

14. The system of claim 11 wherein the reader selection criteria comprises reader name.

15. The system of claim 11 wherein the environment variable is named LD_PRELOAD.

* * * * *